US006765475B1

(12) United States Patent
Lewiner et al.

(10) Patent No.: US 6,765,475 B1
(45) Date of Patent: Jul. 20, 2004

(54) ONE-WAY MESSAGING RECEIVER

(75) Inventors: Jacques Lewiner, 7, avenue de Suresnes, 92210 Saint-Cloud (FR); Eric Carreel, 9, rue du Général Gouraud, 92190 Meudon (FR); Xavier Debreuil, Paris (FR); Bruno Deguet, Avon (FR); Jérôme Lucaes, Paris (FR); Frédéric Thepaut, Paris (FR)

(73) Assignees: Inventel Systemes, Paris (FR); Eric Carreel, Meudon (FR); Jacques Lewiner, Sint-Cloud (FR)

( * ) Notice: Subject to any disclaimer, the term of this patent is extended or adjusted under 35 U.S.C. 154(b) by 0 days.

(21) Appl. No.: 09/530,726

(22) PCT Filed: Nov. 5, 1998

(86) PCT No.: PCT/FR98/02365

§ 371 (c)(1), (2), (4) Date: Jun. 22, 2000

(87) PCT Pub. No.: WO99/25134

PCT Pub. Date: May 20, 1999

(30) Foreign Application Priority Data

Nov. 7, 1997 (FR) .............................................. 97 14037

(51) Int. Cl.[7] ............................ H04Q 1/30; H04Q 7/00

(52) U.S. Cl. .................... 340/7.52; 340/7.39; 340/7.41; 340/7.46; 340/7.48

(58) Field of Search ............................... 340/7.52, 7.48, 340/7.47, 7.41, 7.46, 7.39

(56) References Cited

U.S. PATENT DOCUMENTS 4,845,491 A 7/1989 Fascenda et al. ...... 340/825.44
5,173,688 A * 12/1992 DeLuca et al. ............ 340/7.48
5,258,751 A 11/1993 DeLuca et al. ........ 340/825.44
5,381,138 A * 1/1995 Stair et al. ................. 340/7.41
5,384,565 A * 1/1995 Cannon ...................... 340/7.22
5,418,528 A * 5/1995 Hosack et al. ............. 340/7.39
5,426,422 A * 6/1995 Vanden Heuvel et al. . 340/7.48
5,629,688 A * 5/1997 Muramatsu et al. ....... 340/7.47
5,694,120 A * 12/1997 Indekeu et al. ............ 340/7.23
5,705,995 A * 1/1998 Laflin et al. ................ 340/928
5,764,157 A * 6/1998 Kudoh ....................... 340/7.52

FOREIGN PATENT DOCUMENTS

FR 2 690 028 10/1993

OTHER PUBLICATIONS

French Preliminary Search Report dated Jul. 20, 1998, French Appl. No. FR 9714037.

* cited by examiner

*Primary Examiner*—Brian Zimmerman
*Assistant Examiner*—Clara Yang
(74) *Attorney, Agent, or Firm*—Marshall, Gerstein & Borun LLP

(57) ABSTRACT

Radio paging receiver comprising a central unit associated with a memory containing a tree-structured database comprising a plurality of menu pages and text pages, each menu page including at least an entry capable of being selected to display on the screen another menu page or a text page. Each entry of each menu page comprises a data field capable of being displayed and a call code corresponding to another menu page or text page. Moreover, the central unit is designed for updating the stored menu pages on the basis of radio messages comprising a menu page identification code and at least one entry designed to appear in the menu page presenting said identification code.

7 Claims, 1 Drawing Sheet

ONE-WAY MESSAGING RECEIVER

FIELD OF THE INVENTION

The present invention relates to one-way radio paging receivers.

Generally speaking, known receivers of this type store radio messages in the chronological order in which they were received and re-constitute them in the same order or reverse order when the user of the receiver checks to see what messages have been received.

This approach to processing received radio messages is fine when receiving a relatively small number of messages requiring an immediate response by the user of the receiver but is not suitable for processing general information messages representing a large volume of data (for example sports information, weather forecasts, financial reports, etc.).

BACKGROUND OF THE INVENTION

In order to process this general type of information, a known approach is to store the data received by the receiver in the form of a structured data base, which can be accessed by menus displayed on the screen of the receiver: this is the type of radio paging receiver to which the invention relates.

More specifically, the invention relates to a one-way radio paging receiver comprising:

receiving means for receiving radio messages, an electronic central unit connected to at least one memory for processing and storing the radio messages received, a control interface to enable a user to issue commands to the central unit, and a screen for displaying the information resulting from the received messages, in accordance with instructions received from the user via the control interface, the memory having a tree-structured data base comprising a plurality of menu pages and text pages, the menu pages comprising at least one main menu page which is initially displayed on the screen by the central unit every time the user looks up data; each menu page comprising at least one heading which may be selected by the user via the control interface in order to display a different menu page or text page on the screen and the central unit being programmed to update the tree-structured data base in accordance with radio update messages.

Document U.S. Pat. No. 845,491 describes an example of a radio paging receiver of this type.

OBJECTS AND SUMMARY OF THE INVENTION

The specific objective of this invention is to lighten the process of updating the tree-structured data base in order to limit the volume of data transmitted with each update.

To this end, the invention proposes a radio paging receiver of the type in question, essentially characterised in that each menu page and each text page has an identification code, in that each heading of each menu page comprises on the one hand a data field which can be displayed and on the other a call code corresponding to the identification code of another menu page or text page, and in that the central unit is programmed to:

recognize at least certain radio messages, referred to as menu update messages, comprising a menu page identification code and at least one heading to be displayed on the menu page (already existing or new) containing this identification code, this heading including said displayable data field and said call code, if the menu page identification code contained in said menu update message corresponds to a menu page previously stored in the memory of the receiver, to store the menu data contained in the menu update message in place of the menu data corresponding to said menu page previously stored, and if not, to store said menu data contained in the menu update message as a new menu page.

As a result of these features, the menu pages stored by the receiver can be easily modified by means of the menu update messages, which allows the structure of the tree-structured data base to be amended as required, on the basis of new general information transmitted to the receiver.

In preferred embodiments of the invention, one and/or the other of the following features may optionally be incorporated:

each menu update message comprises a full menu page and the central unit is programmed so that:

if the menu page identification code contained in said menu update message corresponds to a menu page previously stored in the memory of the receiver, the menu page transmitted in said menu update message is stored in place of said menu page previously stored, and if not, the menu page transmitted in said menu update message is stored as a new menu page;

each menu page is sub-divided into fields and the menu data of each menu update message comprises at least one amended field as well as data for locating this amended field, the central unit being programmed so that:

if the menu page identification code contained in said menu update message corresponds to a menu page previously stored in the memory 14 of the receiver, only said amended field is stored, the other fields in the menu page being retained in the memory 14, and if not, the menu data transmitted in said menu update message is stored as a new menu page;

the central unit is programmed to run a process to clean up the data base, consisting in:

determining if the memory contains a text page or a menu page other than the main menu page whose identification code does not appear in the headings of any menu page as a call code, if such a menu or text page does exist, deleting it;

the central unit is programmed to reiterate the data base clean-up process until the memory no longer contains a redundant menu or text page, the central unit is programmed to:

recognize at least certain radio messages, referred to as text update messages, comprising at least a text page identification code and a displayable text, and if the text page identification code contained in said text update message corresponds to a text page previously stored in the memory of the receiver, to store the text page transmitted in said text update message in place of said previously stored text page, and if not, to store the text page transmitted in said text update message as a new text page;

the text pages are sub-divided into fields and the central unit 11 is programmed to:

recognize at least certain radio messages, referred to as text update messages, comprising at least one text page identification code, at least one amended field belonging to this text page as well as data for locating this field in said text page, if the text page identification code contained in said text update message corresponds to a text page previously stored in the memory 14 of the receiver, to store said amended field transmitted in said text update message and retain the other fields of the text page in said memory 14 of the receiver, and if not, to store the text page transmitted in said text update message as a new text page, the central unit is programmed so that when a menu page is displayed on the screen, the displayable data fields of menu page headings are displayed but not the call codes belonging to said headings.

DESCRIPTION OF THE DRAWINGS

Other features and advantages of the invention will become clear from the following description of one of its embodiments, given by way of example but not restrictive in any respect, and with reference to the appended drawings.

Of the drawings.

MORE DETAILED DESCRIPTION

Figure 1:
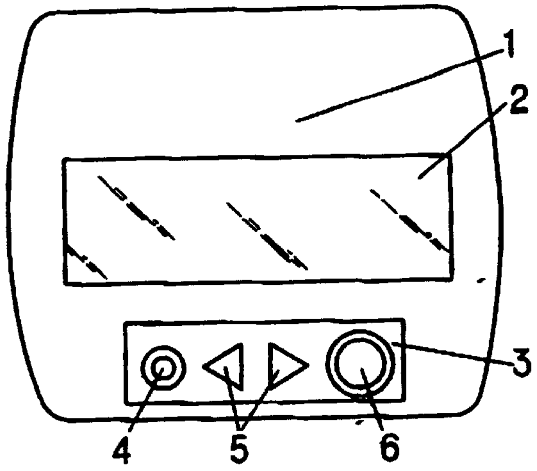
FIG. 1 is a schematic view of one embodiment of a one-way radio paging receiver as proposed by the invention, and FIG. 2 a partial block diagram of the receiver illustrated in FIG. 1.

The same reference numerals are used in the different drawings to denote the same or similar components.

FIG. 1 illustrates a portable one-way radio paging receiver 1 designed to receive messages coded in accordance with the European "ERMES" standard, for example, or any other one-way radio paging protocol such as the "FLEX" standard.

This receiver 1 is an independent, light-weight casing provided with a screen 2 and a simplified keypad 3 comprising four keys, for example, namely:

a key 4 used to access special functions, two scroll keys 5 enabling a cursor to be moved around the screen 2 and/or for selecting specific zones of the screen known as "icons", and a validation key 6, enabling selections made from the screen using the keys 5 to be confirmed.

Figure 2:
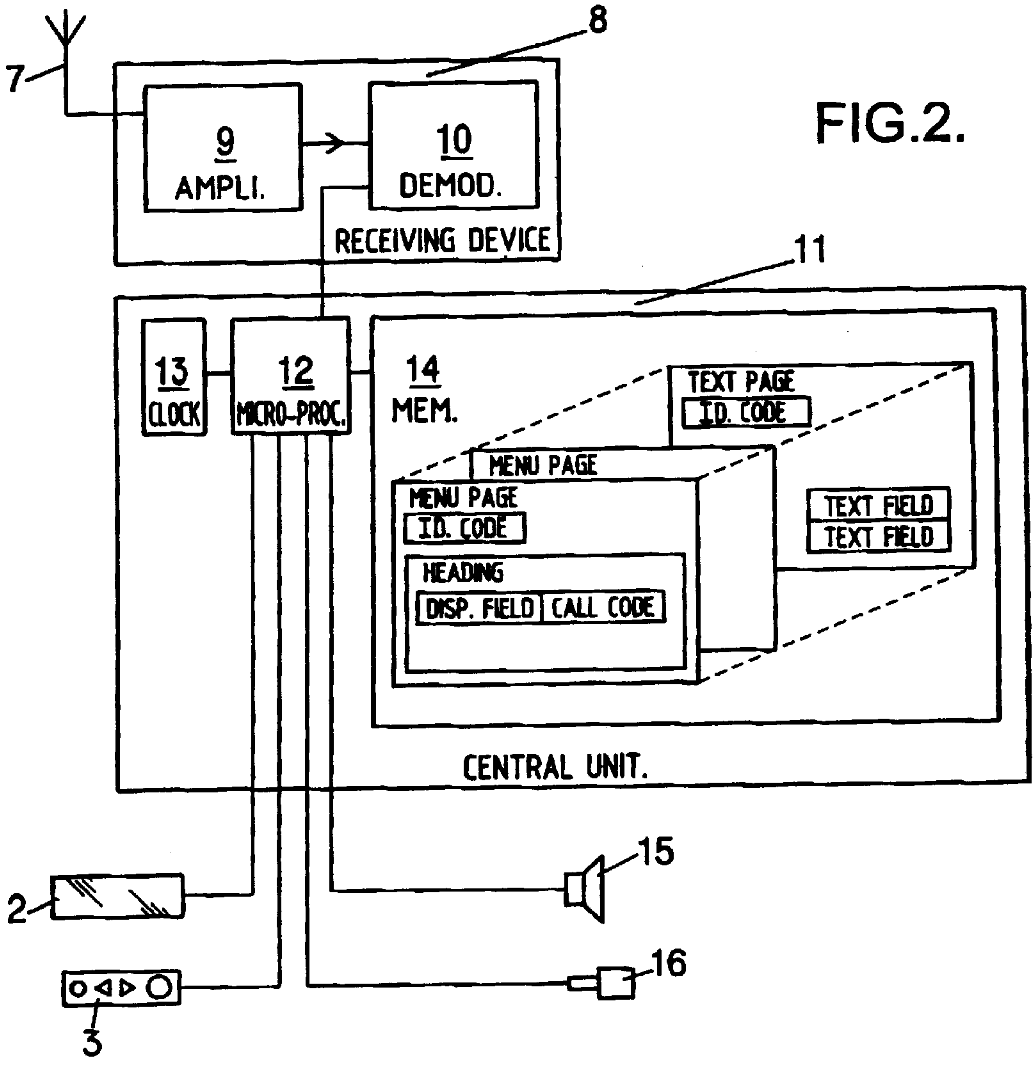

FIG. 2 is a partial block diagram of the receiver 1, which conventionally comprises:

an antenna 7 for receiving radio messages, a receiving device 8 incorporating in particular an amplifier 9 which receives signals picked up by the antenna 7, and a demodulator 10 which receives the signals amplified by the amplifier 9, a central unit 11 which receives the demodulated signals from the output of the demodulator 10, this central unit comprising a micro-controller or micro-processor 12 connected to a clock 13 and at least one memory 14 (the clock and memory may or may not be physically incorporated in the central unit 11, depending on the circumstances), the micro-processor 12 being connected to the screen 2, the keypad 3 and to signaling means designed to attract the attention of the user, for example an electronic buzzer 15 and/or a vibrator 16.

Optionally, the micro-processor 12 may also be connected to a card reader (not illustrated), designed to communicate with a portable memory card, for example in order to:

run the central unit 11 from a program stored on the card or to authorize or not certain operating modes of the receiver 1 depending on validity data (number of units representing a certain sum of money paid in advance or an expiry date of a subscription), as disclosed in the document EP-A-0 865 011 or to identify the user of the receiver, as disclosed in the teaching of document WO 96/31851.

The memory 14 of the receiver has a tree-structured data base comprising a plurality of menu pages and text pages.

Each text page comprises an identification code on the one hand, for example a two-digit code, and a text which can be displayed on the screen 2, on the other.

Furthermore, each menu page has:

an identification code, for example a two-digit code, a displayable alphanumeric title, and a plurality of selectable headings, each comprising a data field which can be displayed on the screen 2 on the one hand and a call code corresponding to the identification code of another menu page or text page on the other.

One of the menu pages, known as the main menu page, is systematically displayed on the screen 2 whenever the user first launches the data lookup procedure.

As a simplified example, the main menu page of the receiver 1 might be entitled "Main Menu", bearing the identification code 00, and contain the following headings:

| DISPLAYABLE DATA FIELDS | CALL CODE |
|---|---|
| PERSONAL MESSAGES | 01 |
| FOOTBALL | 10 |
| TENNIS | 20 |

When this main menu page is displayed, only the title "Main Menu" and the displayable data fields appear, presented optionally as a scrolling list or icons.

If the user selects the heading "FOOTBALL" corresponding to call code 10 using the keys 5 of the keypad and then confirms this choice by depressing the key 6 of said keypad, the micro-processor 12 will display on the screen 2 the displayable data fields of the "FOOTBALL" menu page, which has the reference code 10 and whose headings will be as follows:

| DISPLAYABLE DATA FIELDS | CALL CODE |
|---|---|
| FRANCE - NORWAY | 16 |
| BRAZIL - MOROCCO | 17 |

By selecting and confirming the heading "FRANCE-NORWAY" corresponding to call code 16, the user can then display on the screen 2 the text page bearing identification code 16, which will contain explanations and practical details of the "FRANCE-NORWAY" match.

The way in which the data described above is received by the receiver 1 is as follows.

When the receiver 1 receives a message personally addressed to the user of said receiver, the micro-processor 12 recognizes an identification code in this message in the memory 14 and simultaneously activates the buzzer 15 and/or the vibrator 16 so that the user is alerted to the arrival of a message for him.

This user will then look the message up on the screen 2 and, as applicable, delete it from the memory 14.

Furthermore, if the receiver 1 receives a radio message containing general information, for example sporting information, weather forecasts or financial reports, the micro-processor 12 recognizes this message by means of an identification field or an address contained in said message.

This being the case, the micro-processor 12 does not activate the buzzer 15 or the vibrator 16 but instead simply stores the information received in the memory 14.

These general information messages may be text update messages, containing a full page of text, for example, with its identification code and its displayable text.

This being the case, if the identification code of the text page contained in said text update message corresponds to a text page previously stored in the memory 14, the micro-processor 12 stores the text page just received "as" said text page previously stored (which means that the old text page is physically or virtually deleted from the memory 14 and the text page just received is stored in said memory).

If, on the contrary, the text page just received has an identification code which does not correspond to any text page previously stored, it is simply stored in memory as a new text page.

Moreover, the general information messages received may also be menu update messages, which will comprise a full menu page, for example, with its identification code, its title and its different headings, each comprising a displayable data field and a call code.

As with the text pages, if the menu page identification code in said menu update message corresponds to a menu page previously stored in the memory 14, the micro-processor 12 will store the menu page just received in place of said previously stored menu page (which means that, as with the process of updating text pages, the old menu page is physically or virtually deleted from the memory 14 and the menu page received is in turn stored in said memory).

If, on the other hand, the identification code of menu pages contained in the menu update message does not correspond to any menu page previously stored in the memory 14, the menu page just transmitted is stored in the memory as a new menu page.

Furthermore, when a specific message or a specific instruction in a message is received, or alternatively at a given time (for example once a day), the micro-processor 12 searches to see if there are any text pages or menu pages in the memory 14, other than the main menu page, whose identification code does not appear as a call code in the headings of any menu page.

If this is the case, the micro-processor 12 deletes this redundant menu or text page (by physically or virtually erasing it from the memory 14) and reiterates the process until there are no longer any redundant text or menu pages in the memory 14.

In the simplified example described above, it is assumed that the receiver 1 has received:

a text update message containing two new text pages for "FRANCE-ITALY" with an identification code 18 and for "BRAZIL-USA" with an identification code 19, and a menu update message containing a new page for the "FOOTBALL" menu having identification code 10, listing new headings as follows:

| DISPLAYABLE DATA FIELDS | CALL CODE |
|---|---|
| FRANCE - ITALY | 18 |
| BRAZIL - USA | 19 |

In this case, the menu page with code 10 is stored in the memory 14 in place of the old page bearing identification code 10 and the two text pages 18 and 19 are stored as new pages.

Furthermore, the old text pages with identification codes 16 and 17 are then located by the micro-processor 12 as being redundant since their identification code does not appear as a call code in any menu heading so that these two text pages are deleted from the memory 14.

In another embodiment, in order to limit the transmission time of update messages, it is possible to set the system up so that only the amended parts of a text page or menu page are transmitted to the receiver 1.

To this end, it is possible to sub-divide the text or menu pages into a certain number of fields delimited by field separators, which may be predetermined characters.

This being the case, if an update message contains two field separators as brackets, the field corresponding to the text or menu page is left unchanged in the memory 14 of the receiver 1.

Turning back to the simplified example described above and assuming that the field separator is represented by the character "*", the text page "FRANCE-ITALY" might read as follows, for example:

"*FRANCE-ITALY*3-0*", where

"3-0" represents the score of the "FRANCE-ITALY" match.

In this particular case, assuming that ITALY scores a goal and the score becomes "3-1", it will be sufficient to transmit to the receiver 1 a message containing the identification code for the text page "FRANCE-ITALY" with the following text "**3-1*", in which case the text page "FRANCE-ITALY" stored in the memory 14 becomes:

"*FRANCE-ITALY:*3-1*".

We claim:

1. A one-way radio paging receiver, comprising:

receiving means for receiving radio messages, an electronic central unit connected to at least one memory for processing and storing the radio messages received, a control interface to enable a user to issue commands to the central unit, and a screen for displaying the information resulting from the received messages, in accordance with instructions received from the user via the control interface, the memory having a tree-structured data base, comprising a plurality of menu pages and text pages, the menu pages comprising at least one main menu page, which is initially displayed on the screen by the central unit every time the user looks up data, each menu page comprising at least one heading which may be selected by the user via the control interface in order to display a different menu page or text page on the screen and the central unit being programmed to update the tree-structured data base in accordance with radio update messages, wherein each menu page has an identification code adapted for identifying said menu page and each text page has an identification code adapted for identifying said text page, wherein each heading of each menu page comprises on the one hand a data field which can be displayed and on the other a call code corresponding to the identification code of said different menu page or text page to be displayed if the said heading is selected by the user, and wherein the central unit is programmed to:

recognize at least certain radio messages, referred to as menu update messages, comprising a menu page identification code and menu data comprising at least one heading to be displayed on the menu page containing this identification code, this heading including said displayable data field and said call code, if the menu page identification code contained in said menu update message corresponds to a menu page previously stored in the memory of the receiver, to store the menu data contained in the menu update message in place of the menu data corresponding to said menu page previously stored, and if not, to store said menu data contained in the menu update message as a new menu page, wherein the central unit is programmed to run a process to clean up the data base, consisting in determining if the memory contains a text page or a menu page, other than the main menu page, whose identification code does not appear in the headings of any menu page as a call code, and if a menu or text page does exist, deleting it.

2. A receiver as claimed in claim 1, in which each menu update message comprises a full menu page and the central unit is programmed so that:

if the menu page identification code contained in said menu update message corresponds to a menu page previously stored in the memory of the receiver, the menu page transmitted in said menu update message is stored in place of said menu page previously stored, and if not, the menu page transmitted in said menu update message is stored as a new menu page.

3. A receiver as claimed in claim 1, in which each menu page is sub-divided into fields and the menu data of each menu update message comprises at least one amended field as well as data for locating this amended field, the central unit being programmed so that:

if the menu page identification code contained in said menu update message corresponds to a menu page previously stored in the memory of the receiver, only said amended field is stored, the other fields in the menu page being retained in the memory, and if not, the menu data transmitted in said menu update message is stored as a new menu page.

4. A receiver, as claimed in claim 1, in which the central unit is programmed to reiterate the data base clean-up process until the memory no longer contains a redundant menu or text page.

5. A receiver as claimed in claim 1, in which the central unit is programmed to:

recognize at least certain radio messages, referred to as text update messages, comprising at least a text page identification code and a displayable text, and if the text page identification code contained in said text update message corresponds to a text page previously stored in the memory of the receiver, to store the text page transmitted in said text update message in place of said previously stored text page, and if not, to store the text page transmitted in said text update message, as a new text page.

6. A receiver as claimed in claim 1, in which the text pages are sub-divided into fields and the central unit is programmed to:

recognize at least certain radio messages, referred to as text update messages, comprising at least one text page identification code, at least one amended field belonging to this text page as well as data for locating this field in said text page, if the text page identification code contained in said text update message corresponds to a text page previously stored in the memory of the receiver, to store said amended field transmitted in said text update message and retain the other fields of the text page in said memory of the receiver, and if not, to store the text page transmitted in said text up message as a new text page.

7. A receiver as claimed in claim 1, in which the central unit is programmed so that when a menu page is displayed on the screen, the displayable data fields of menu page headings are displayed but not the call codes belonging to said headings.

* * * * *